US009586567B2

(12) United States Patent
Derouault et al.

(10) Patent No.: US 9,586,567 B2
(45) Date of Patent: Mar. 7, 2017

(54) SPRING BRAKE CYLINDER HAVING COMBINED INLET AND OUTLET DIAPHRAGM VALVE

(71) Applicant: KNORR-BREMSE Systeme fuer Nutzfahrzeuge GmbH, Munich (DE)

(72) Inventors: Sylvain Derouault, Hermival les Vaux (FR); Herve Lebigre, Saint Julien de Mailoc (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 147 days.

(21) Appl. No.: 14/576,930

(22) Filed: Dec. 19, 2014

(65) Prior Publication Data
US 2015/0101897 A1    Apr. 16, 2015

Related U.S. Application Data

(63) Continuation of application No. PCT/EP2013/062739, filed on Jun. 19, 2013.

(30) Foreign Application Priority Data

Jun. 22, 2012 (DE) .................. 10 2012 012 491

(51) Int. Cl.
*B60T 17/08* (2006.01)
*F16K 17/18* (2006.01)
(Continued)

(52) U.S. Cl.
CPC ............ *B60T 17/085* (2013.01); *F16D 65/14* (2013.01); *F16K 15/148* (2013.01); *F16K 15/16* (2013.01);
(Continued)

(58) Field of Classification Search
CPC ...... B60T 17/002; B60T 17/08; B60T 17/083; B60T 17/086; F16K 15/16; F16K 15/148; F16K 17/18
See application file for complete search history.

(56) References Cited

U.S. PATENT DOCUMENTS 3,037,522 A * 6/1962 Millan .................. F16K 15/148
                                                        137/493.2
3,883,030 A * 5/1975 Mathews .............. B60T 17/085
                                                        137/513.5
(Continued)

FOREIGN PATENT DOCUMENTS

DE    1 505 574 A1    7/1970
DE    2 146 594       3/1973
(Continued)

OTHER PUBLICATIONS

International Search Report (PCT/ISA/210) dated Oct. 10, 2013, with English translation (Four (4) pages).
(Continued)

*Primary Examiner* — Bradley King
(74) *Attorney, Agent, or Firm* — Crowell & Moring LLP

(57) ABSTRACT

A spring brake cylinder is provided for brake systems of vehicles. It includes a spring brake piston, which is arranged in a housing of the spring brake cylinder and can be actuated by at least one accumulator spring and separates a spring chamber containing the accumulator spring from a spring brake chamber of the spring brake cylinder that can be filled with air for release and can be vented of air for application. A circulation device is provided at least for venting the spring chamber directly into the atmosphere. The circulation device is configured as a diaphragm valve device having at least one elastically movable outlet diaphragm and at least one elastically movable inlet diaphragm. The inlet diaphragm and the outlet diaphragm are in a closed position in
(Continued)

contact with an associated valve seat in the home position of the diaphragms and, when a pressure difference between the spring chamber and the atmosphere exceeding a minimum pressure value is present, the diaphragms are moved into an open position lifted from the valve seat in order to build up and reduce pressure in the spring chamber.

16 Claims, 3 Drawing Sheets

(51) Int. Cl.
  *F16K 15/14*  (2006.01)
  *F16K 15/16*  (2006.01)
  *F16D 65/14*  (2006.01)
  *F16D 121/14*  (2012.01)
  *F16D 125/58*  (2012.01)
(52) U.S. Cl.
  CPC .......... *F16K 17/18* (2013.01); *F16D 2121/14* (2013.01); *F16D 2125/582* (2013.01)
(56) References Cited

U.S. PATENT DOCUMENTS

| | | | | |
|---|---|---|---|---|
| 4,440,308 A * | 4/1984 | Baker | ................ | B60K 15/0406 137/493.8 |
| 5,836,233 A * | 11/1998 | Rumsey | ................ | B60T 17/085 188/170 |
| 5,873,297 A * | 2/1999 | Stojic | .................... | B60T 17/002 137/512.2 |
| 6,389,954 B1 | 5/2002 | Constantinides et al. | | |
| 2005/0072475 A1* | 4/2005 | Seo | ........................ | F16K 15/144 137/512.15 |
| 2005/0211319 A1* | 9/2005 | Kobetsky | ............. | B65D 77/225 137/854 |
| 2008/0142102 A1* | 6/2008 | Savard | .................. | F04B 43/067 137/854 |
| 2010/0187230 A1* | 7/2010 | Beer | ..................... | B65D 77/225 220/89.1 |

FOREIGN PATENT DOCUMENTS

| | | |
|---|---|---|
| DE | 30 16 201 A1 | 11/1981 |
| EP | 1 065 118 A1 | 1/2001 |
| GB | 1 369 732 | 10/1974 |

OTHER PUBLICATIONS

International Preliminary Report on Patentability (PCT/IB/373), including Written Opinion (PCT/ISA/237) dated Dec. 23, 2014 with English-language translation (Sixteen (16) pages).

German Office Action issued in counterpart German Application No. 10 2012 012 491.0 dated Jul. 13, 2016 (eight (8) pages).

* cited by examiner

US 9,586,567 B2

SPRING BRAKE CYLINDER HAVING COMBINED INLET AND OUTLET DIAPHRAGM VALVE

CROSS REFERENCE TO RELATED APPLICATIONS

This application is a continuation of PCT International Application No. PCT/EP2013/062739, filed Jun. 19, 2013, which claims priority under 35 U.S.C. §119 from German Patent Application No. 10 2012 012 491.0, filed Jun. 22, 2012, the entire disclosures of which are herein expressly incorporated by reference.

BACKGROUND AND SUMMARY OF THE INVENTION

The invention is based on a spring brake cylinder for brake installations of vehicles, having a spring brake piston which is arranged in the housing of the spring brake cylinder and which can be actuated by means of at least one preloaded spring. The spring brake piston separates a spring chamber which contains the preloaded spring from a spring brake chamber of the spring brake cylinder, which chamber can be ventilated for release and which can be vented for deployment, wherein a circulation device at least for venting the spring chamber directly to the atmosphere is provided.

From the prior art, for example, from DE-A-1 505 574, there are known spring brake cylinders with ventilation devices in which, at the outer wall of the spring brake cylinder within an additional housing, a diaphragm valve mechanism is provided in order to produce a connection between the spring brake cylinder chamber and the spring chamber when the spring brake piston is displaced when the spring brake cylinder is deployed by the preloaded spring. The volume of the spring chamber, which increases in this instance, allows the production therein of a reduced pressure which is decreased by the diaphragm valve mechanism, that is to say, during the displacement of the spring brake piston, the mechanism ventilates the spring chamber with compressed air originating from the spring brake chamber. When the spring brake cylinder is released, the diaphragm valve mechanism blocks the mentioned connection, the compressed air in the spring chamber which is then compressed being discharged by means of an additional ventilation valve in a through-hole in the base of the spring brake cylinder to the atmosphere. Consequently, a relatively high level of complexity is involved in order to carry out a ventilation and venting of the spring chamber of the spring brake cylinder.

In this regard, an object of the present invention is to further develop a spring brake cylinder of the above-mentioned type in such a manner that a ventilation and venting of the spring chamber are carried out with less complexity.

This and other objects are achieved according to the invention by a spring brake cylinder for brake installations of vehicles, having a spring brake piston which is arranged in the housing of the spring brake cylinder and which can be actuated by at least one preloaded spring, and which separates a spring chamber which contains the preloaded spring from a spring brake chamber of the spring brake cylinder. The spring brake chamber can be ventilated for release and can be vented for deployment. A circulation device at least for venting the spring chamber directly to the atmosphere is provided. The circulation device is constructed as a diaphragm valve having at least one resiliently movable outlet diaphragm and at least one resiliently movable inlet diaphragm. The inlet diaphragm and the outlet diaphragm in their basic position are in a closure position, which is characterized in contact with an associated valve seat. In the event of a pressure difference which exceeds a respective minimum pressure value between the spring chamber and the atmosphere, the inlet and outlet diaphragms are controlled into an open position lifted-off of the valve seat in order to increase pressure and decrease pressure in the spring chamber.

The invention makes provision for the circulation device to be constructed as a diaphragm valve having at least one resiliently movable outlet diaphragm and at least one resiliently movable inlet diaphragm, wherein the inlet diaphragm and the outlet diaphragm in their basic position are in a closure position which is characterized in contact with an associated valve seat and, in the event of a pressure difference which exceeds a respective minimum pressure value between the spring chamber and the atmosphere, are controlled into an open position raised from the valve seat in order to increase pressure and decrease pressure in the spring chamber.

The minimum pressure value will be or is reached when the volume of the spring chamber decreases when the spring brake cylinder is released and increases when the spring brake cylinder is deployed. Then, the outlet diaphragm is moved from the closure position into the open position thereof when the volume of the spring chamber decreases when the spring brake cylinder is released and the inlet diaphragm is moved from the closure position thereof into the open position when the volume of the spring chamber increases when the spring brake cylinder is deployed.

It is then possible to dispense with an additional housing as in the generic prior art. Furthermore, the ventilation of the spring chamber when the spring brake cylinder is deployed is no longer carried out by use of compressed air from the spring brake chamber, but instead from the atmosphere, whereby the circulation device is constructed in a very simple and cost-effective manner.

In one aspect of the invention in particular, the at least one inlet diaphragm and the at least one outlet diaphragm are constructed so as to be spatially separated from each other, wherein a separate valve seat is associated with the inlet diaphragm and the outlet diaphragm, respectively. The inlet or outlet characteristic can then be individually adapted to the prevailing pressure relationships.

Furthermore, for example, the at least one inlet diaphragm and the at least one outlet diaphragm are connected to a base member which is retained in a central through-opening in the base of the spring chamber. Then, the base member can be assembled together with the at least one inlet diaphragm and the at least one outlet diaphragm as a pre-assembled unit on the spring brake cylinder.

The base member is preferably constructed in an integral manner from a resilient material, having a retention portion which can be assembled in a positive-locking manner with resilient deformation in an associated through-opening in the base of the spring brake cylinder, wherein there is retained on the base member a retention member, for example, in the form of a retention pin, on which there is formed the at least one inlet diaphragm and/or the at least one outlet diaphragm which cooperates as a diaphragm valve with at least one connection opening formed in the base member or in the base between the spring chamber and the atmosphere.

According to a further development, the base member comprises a resilient material to be retained in a positive-locking manner in the central through-opening in the base of the spring chamber by way of a retention portion which has an undercut cross-section. The retention portion is resiliently deformed from the outer side when the base member is introduced into the through-opening in order, in the assembled end state, to protrude inside the spring chamber in a manner engaging over an inner edge of the through-opening. A very simple method of assembling the base member on the spring brake cylinder is thereby provided.

To this end, the retention portion of the base member may be constructed in a conical manner and may taper in the direction toward the inner side of the spring chamber.

Furthermore, the at least one inlet diaphragm may be arranged on a base face of the base member, which face is directed inside the spring chamber, and the at least one outlet diaphragm may be arranged on an outwardly facing outer face of the base member, wherein the at least one inlet diaphragm and the at least one outlet diaphragm cooperate with a plurality of connection openings between the spring chamber and the atmosphere in a sealing manner.

In this instance, according to a first embodiment, at least one connection opening may be formed in the base of the spring brake cylinder and at least one connection opening in the base member. In this instance, the at least one connection opening in the base may cooperate, for example, with the at least one outlet diaphragm and the at least one connection opening in the base member may cooperate with the at least one inlet diaphragm.

According to a second embodiment, the connection openings may also all be formed in the base member, wherein the at least one inlet diaphragm cooperates with a connection opening or with a group of connection openings and the at least one outlet diaphragm cooperates with another connection opening or another group of connection openings. This second embodiment has the advantage that such connection openings are more simply prefabricated in a base member, which is separated from the spring brake cylinder, than in the spring brake cylinder itself.

In a particularly preferred manner, the at least one inlet diaphragm is connected to a retention pin which is retained in the base member and protrudes radially at right angles from the retention pin.

According to the first embodiment, the inlet diaphragm can be constructed as a disc diaphragm which is integral with a retention pin produced from a resilient material and which, from an end of the retention pin directed inside the spring chamber in a manner protruding radially outward, forms a free disc diaphragm edge which cooperates in a sealing manner with a plurality of connection openings in the base member which are radially spaced from the retention pin.

In this instance, the retention pin is, for example, retained in the base member in a positive-locking manner so as to protrude through a central through-hole of the base member with a head piece, which is expanded in cross-section and which faces outward. The head piece and/or the base member is/are resiliently deformed when the retention pin is inserted into the through-hole of the base member in order in the assembled end state to engage over an outer edge of the through-hole of the base member in a positive-locking manner. The retention pin can thereby be assembled in a simple manner with the inlet diaphragm by means of insertion into the central through-hole of the base member.

In many spring brake cylinders, there is formed on the base of the housing of the spring brake cylinder an annular recess which serves to center the preloaded spring in the spring chamber. Furthermore, with a corresponding construction size of the spring chamber, it may be necessary to ventilate and vent the spring chamber with a relatively large volume of air when the spring brake cylinder is released and deployed. The cross-section provided by the connection openings in the base member may then not be sufficient to transport the air volume which is intended to be supplied or discharged.

In the first embodiment, the at least one outlet diaphragm is therefore formed at the end side on a web of the base member, which web bridges an annular recess in an outer face of the base of the spring brake cylinder, and cooperates with at least one outer valve seat at the edge of at least one connection opening in the base of the spring brake cylinder, wherein the web and the at least one outlet diaphragm are constructed integrally with the base member. The at least one connection opening in the base, in contrast to the connection openings in the base member which then serve exclusively to ventilate the spring chamber, then provides a venting cross-section.

In this instance, the web between the outlet diaphragm and the recess in the base of the spring brake cylinder may be retained on the base by way of a pin which protrudes away from the web and which is retained in a hole in the base in a positive-locking manner. The base member is thereby retained in a secure manner on the spring brake cylinder together with the web and the outlet diaphragm which is formed on the web. Furthermore, the base member together with the web and the outlet diaphragm on the spring brake cylinder may be assembled in a simple manner by way of parallel insertion of the retention portion (see above) and the pin into the associated openings in the base of the spring brake cylinder.

According to the second embodiment, the at least one inlet diaphragm and the at least one outlet diaphragm, when viewed in cross-section, may protrude in opposite directions away from the retention pin in a radially outward direction and may cooperate with diametrically opposing connection openings in the base member.

Furthermore, there may be provision in this second embodiment for there to be formed integrally on the retention pin at the end side contractions and head pieces which are increased in terms of diameter with respect thereto, wherein the head pieces are inserted through openings of the inlet diaphragm and the outlet diaphragm with resilient deformation, in order to form a positive-locking connection with an undercut cross-section between the retention pin, on the one hand, and the inlet diaphragm and outlet diaphragm, on the other hand. The inlet diaphragm and outlet diaphragm are secured to the retention pin in this manner and, at the same time, form an axial securing member for the retention pin in the through-hole of the base member. These measures also contribute greatly to a very simple and cost-effective production and assembly of the spring brake cylinder.

The spring brake cylinder according to the invention may be constructed as a separate spring brake cylinder or may be provided as an integral component of a combined service brake and spring brake cylinder for pneumatic or electro-pneumatic brake installations of vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 5:
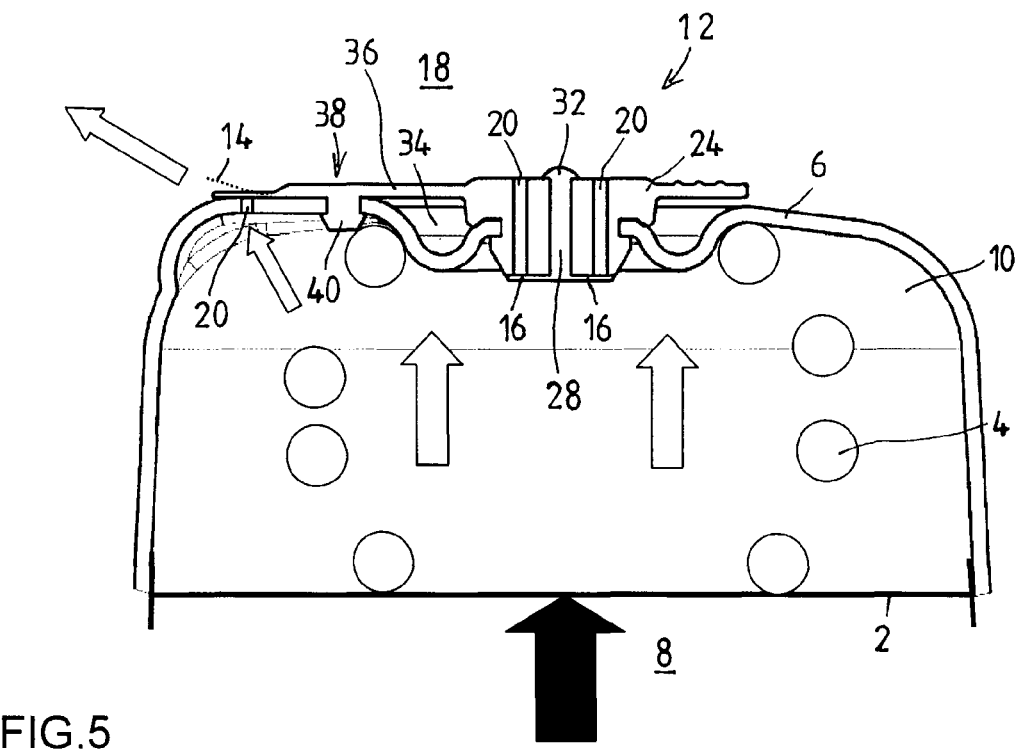
FIG. 5 is a cross-section of the spring brake cylinder with the circulation device of FIG. 1 during the venting.
Figure 6:
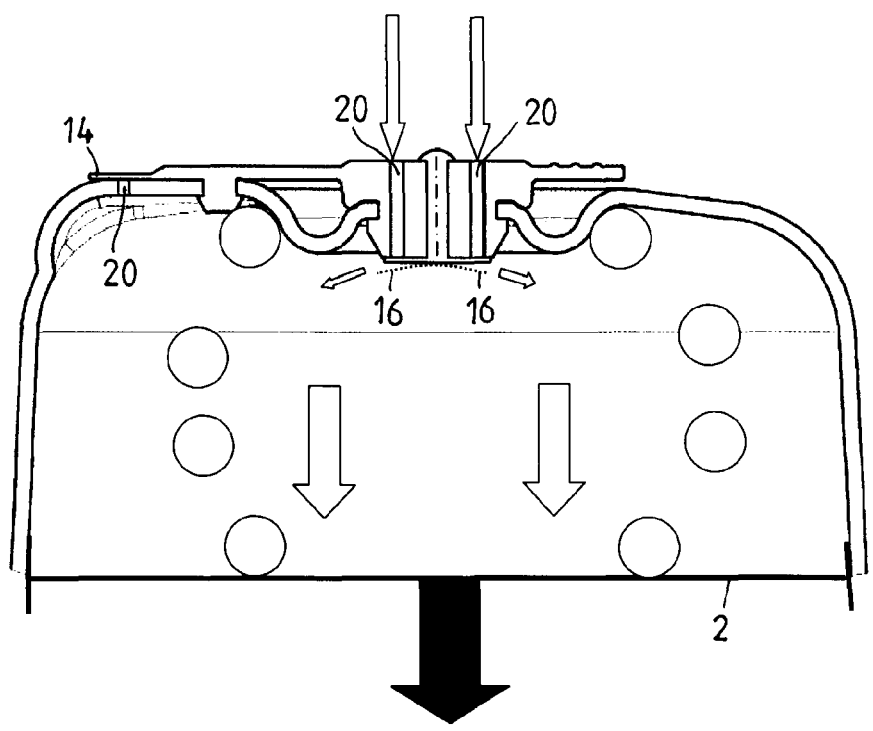
FIG. 6 is a cross-section of the spring brake cylinder with the circulation device of FIG. 1 during the ventilation.

FIG. 5 and FIG. 6 illustrate a spring brake cylinder 1, preferably as a component of a combined service brake and spring brake cylinder, also referred to as a combi-cylinder. Such a combi-cylinder includes a service brake cylinder and a spring brake cylinder 1 which is connected thereto in a structural and functional manner. The service brake cylinder (which is not shown here) and the spring brake cylinder 1 are separated from each other by way of an intermediate wall (also not shown). Inside the spring brake cylinder 1, a spring brake piston 2 is displaceably arranged. A preloaded spring 4 is in abutment against one side of the spring brake piston 2. The preloaded spring 4 is supported at the opposing side thereof on the base 6 of the spring brake cylinder 1. Between the spring brake piston 2 and the intermediate wall there is formed a spring brake chamber 8 which is vented (emptied) in order to deploy the spring brake cylinder 1 and is ventilated (filled) for release.

During ventilation, the spring brake piston 2 is displaced axially into the release position with the preloaded spring 4 being tensioned. This situation is shown in FIG. 5. If, in contrast, for the purposes of braking, for example, for use of the parking brake, the spring brake chamber 8 is vented, then the preloaded spring 4 may displace the spring brake piston 2 into the deployed position, as shown in FIG. 6. At the side of the spring brake piston 2 facing away from the spring brake chamber 8, a spring chamber 10 which receives the preloaded spring 4 is formed. The operating method of such a spring brake cylinder 4 or such a combi-cylinder is sufficiently well known. Therefore, this will not be discussed in greater detail here.

The volume of this spring chamber 10 decreases when the spring brake cylinder 1 is released (FIG. 5) and increases during deployment (FIG. 6). There is consequently produced in the spring chamber 10 reduced pressure or excess pressure which is intended to be removed. This is done so that no counter-force is produced on the spring brake piston 2 and also so that, via the seals of the spring brake piston 2 with the inner wall of the spring brake cylinder, where possible no noisy and therefore disruptive internal pressure compensation is produced. There is therefore described below an outer circulation device 12 of the spring brake cylinder 1, which is provided for external ventilation and venting of the spring chamber 10 directly from or to the atmosphere 18.

The circulation device 12 is constructed as a diaphragm valve device with a resiliently movable outlet diaphragm 14 and a resiliently movable inlet diaphragm 16. The inlet diaphragm and the outlet diaphragm in the basic position thereof are located in a closure position which is characterized in contact with an associated valve seat and, in the event of a pressure difference which exceeds a minimum pressure value between the spring chamber 10 and the atmosphere 18, are controlled into an open position raised from the valve seat in order to increase and decrease pressure in the spring chamber 10. In FIG. 5 and FIG. 6, the open position of the inlet diaphragm 16 and the outlet diaphragm 14 is illustrated by means of a dashed line.

The inlet diaphragm 16 and the outlet diaphragm 14 are constructed so as to be spatially separated from each other. A separate valve seat is associated with the inlet diaphragm 16 and the outlet diaphragm 14, preferably in the form of an edge of a connection opening 20 between the spring chamber 10 and the atmosphere 18. Furthermore, for example, the inlet diaphragm 16 and the outlet diaphragm 14 are connected to a base member 24 which is retained in a central through-opening 22 in the base 6 of the spring chamber 10.

More specifically, the base member 24 which comprises a resilient material such as an elastomer material is retained in the central through-opening 22 in the base 6 of the spring chamber 10 in a positive-locking manner by way of a retention portion 26 which has an undercut cross-section. The retention portion 26 resiliently deforms from the outer side when the base member 24 is inserted into the through-opening 22, in order, in the assembled end state, to protrude into the inner side of the spring chamber 10 so as to engage over an inner edge of the through-opening 22. To this end, the retention portion 26 of the base member 24 is constructed, for example, in a conical manner and tapers toward the inner side of the spring chamber 10.

Furthermore, the inlet diaphragm 16 is arranged on a base face of the base member 24, which face faces the inner side of the spring chamber 10. The outlet diaphragm 14 is arranged on an outer face of the base member 24, which face faces outward, that is to say, toward the atmosphere 18. The inlet diaphragm 16 and the outlet diaphragm 14 preferably cooperate in a sealing manner with associated connection openings 20 between the spring chamber 10 and the atmosphere 18.

According to the first embodiment of the circulation device 12 illustrated in FIG. 1 and FIGS. 3 to 6, there are formed, for example, at least one connection opening 20 in the base 6 of the spring brake cylinder 1 and at least one connection opening 20 in the base member 24 of the circulation device 12. More specifically, there are formed, for example, as through-holes a connection opening 20 in the base 6 of the spring brake cylinder 1 and a plurality of, in particular four, connection openings 20 in the base member 24. In this instance, the connection opening 20 in the base 6 may cooperate, for example, with the outlet diaphragm 14 and the connection openings 20 in the base member 24 may cooperate with the inlet diaphragm 16.

Figure 1:
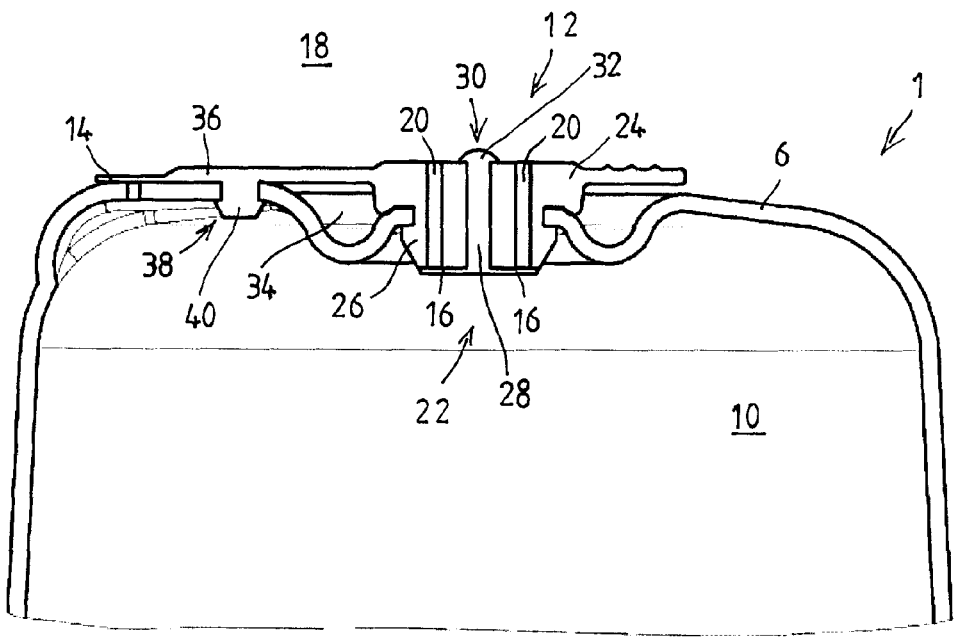
FIG. 1 is a cross-section of a portion of a spring brake cylinder having a circulation device according to a first embodiment of the invention.
Figure 2:
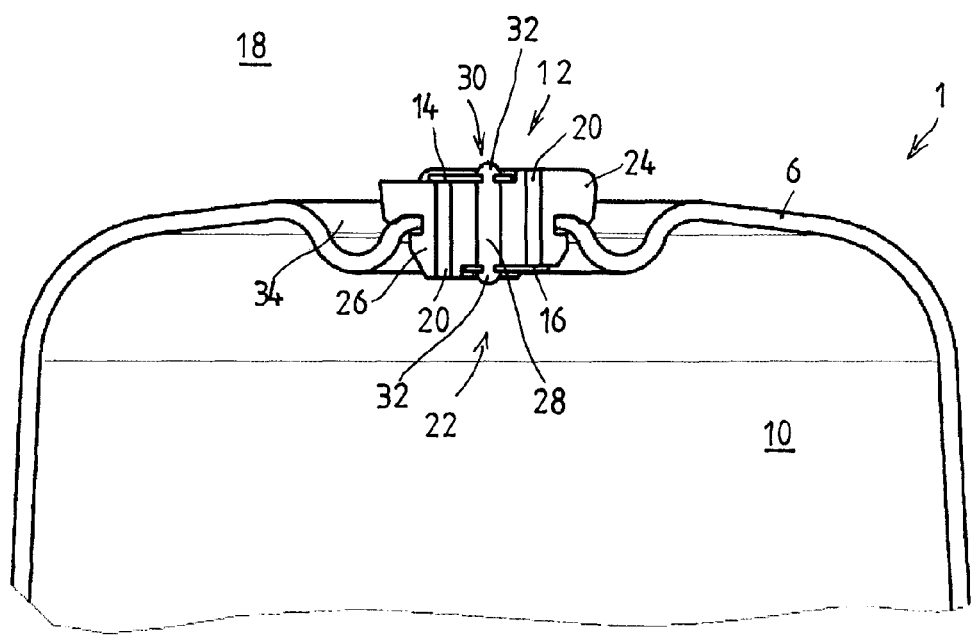
FIG. 2 is a cross-section of a portion of a spring brake cylinder having a circulation device according to a second embodiment of the invention.

In a particularly preferred manner, in both embodiments according to FIG. 1 and FIGS. 3 to 6, on the one hand, and FIG. 2, on the other hand, the inlet diaphragm 16 is connected to a retention pin 28. The retention pin 28 is retained in the base member 24. The inlet diaphragm 16 protrudes away from the retention pin 28 radially at right angles.

According to the second embodiment shown in FIG. 2, the connection openings 20 are all formed in the base member 24, the inlet diaphragm 16 then cooperating with a connection opening 20 or with a group of connection openings 20 and the outlet diaphragm 14 cooperating with another connection opening 20 or another group of connection openings 20.

According to the first embodiment of FIG. 1 and FIGS. 3 to 6, the inlet diaphragm 16 may be constructed as a disc diaphragm, which is integral with the retention pin 28, produced from a resilient material and which extends from an end of the retention pin 28 directed inside the spring chamber 10 a free disc diaphragm edge so as to protrude radially outward. The free disc diaphragm edge cooperates in a sealing manner with a plurality of connection openings 20 in the base member 24 which are radially and, for example, identically spaced apart from the retention pin 28 in the manner of a diaphragm valve.

In this instance, the retention pin 28 is, for example, retained in the base member 24 in a positive-locking manner, for example, so as to protrude through a central through-hole 30 of the base member 24 with a head piece 32 which is expanded in terms of cross-section and which is directed outward. The head piece 32 and/or the base member 24 are resiliently deformed when the retention pin 28 is inserted into the through-hole 30 of the base member 24, in order in the assembled end state to engage over an outer edge of the through-hole 30 of the base member 24 in a positive-locking manner.

As can be seen from FIG. 1 and FIGS. 3 to 6, in the first embodiment the outlet diaphragm 14 is formed, for example, at the end side on a web 36 of the base member 24, which web bridges an annular recess 34 in an outer face of the base 6 of the spring brake cylinder 1, and cooperates with an outer valve seat at the edge of the connection opening 20 of the base 6 of the spring brake cylinder 1. In this instance, the web 36 and the outlet diaphragm 14 are preferably constructed in an integral manner with the base member 24 and from a resilient material, such as elastomer material. Furthermore, the web 36 is retained on the cylinder between the end-side outlet diaphragm 14 and the recess 34 in the base 6 of the spring brake cylinder 1 by a pin 40 which protrudes away from the web 36 and which is retained in a hole 38 in a positive-locking manner. This pin 40 has a head which is expanded in terms of diameter and is also axially inserted into the hole 38 with resilient deformation in order in the assembled state to be received in the hole 38 in a sealing and positive-locking manner.

Consequently, in the first embodiment, the retention pin 28 is first introduced together with the inlet diaphragm 16, which is formed thereon, into the through-opening 30 in the base member 24 with a positive-locking connection being formed. The inlet diaphragm 16 thereby at the same time comes into contact with the edges of the connection openings 20 in the base member 24 in order to close them in a sealing manner in the closure position. Then, the base member 24 together with the outlet diaphragm 14 which is formed thereon, the web 36 which is formed thereon and the pin 40 which is formed thereon, is assembled on the spring brake cylinder 1 by the conical retention portion 26 of the base member 24 being introduced into the through-opening 22 in the base 6 of the spring brake cylinder 1 and the pin 40 being introduced into the hole 38 with resilient deformation in order in the assembled state to form a positive-locking connection. The outlet diaphragm 14 thereby at the same time comes into contact with the edge of the connection opening 20 in the base 6 of the spring brake cylinder 1 in order to close it in a sealing manner in the closure position.

Figure 3:
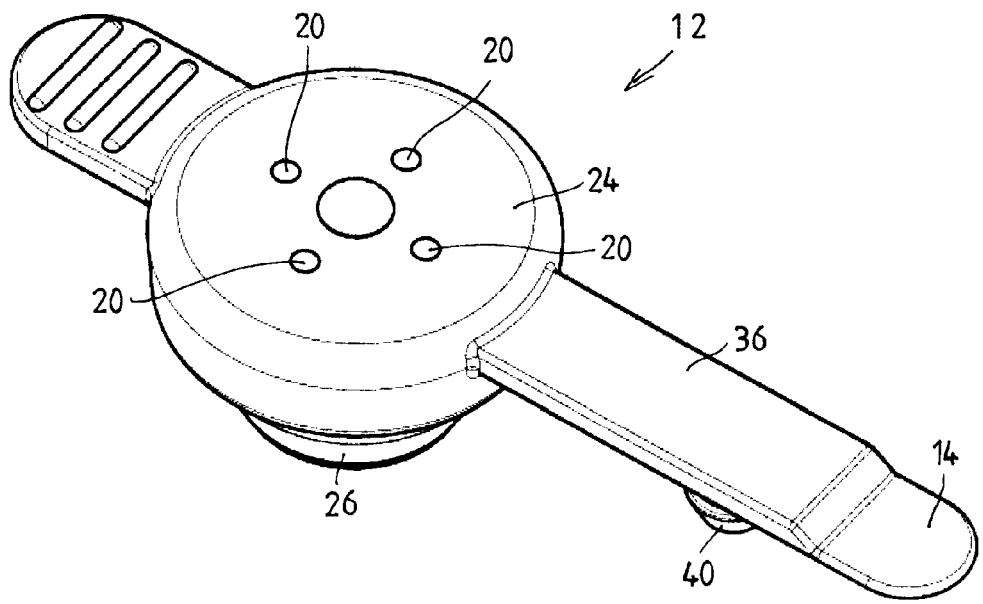
FIG. 3 is a perspective illustration of the circulation device of FIG. 1.
Figure 4:
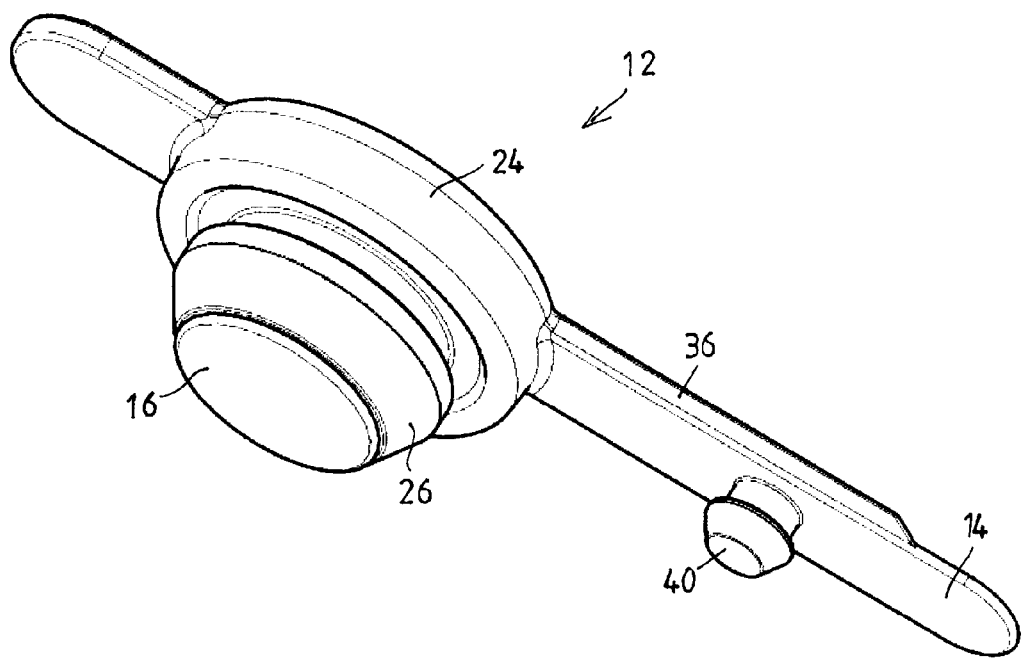
FIG. 4 is another perspective illustration of the circulation device of FIG. 1.

In particular, it can be seen from FIG. 3 and FIG. 4 that the circulation device 12 contains an integral base member 24 which can be assembled on the spring brake cylinder 1 simply by inserting the formed retention portion 26 and the formed pin 40 in the associated through-opening 22 or hole 38 in the base 6. The circulation device 12 comprises a resilient material such as an elastomer material, on which in addition the through-openings 20 and at least one lip-like outlet diaphragm 14 are also already formed. Furthermore, the circulation device 12 contains the retention pin 28 which is retained in or on the base member 24 together with the plate-like inlet diaphragm 16 which is formed thereon. However, the inlet diaphragm 16 could also be constructed in a lip-like manner.

According to the second embodiment shown in FIG. 2, the inlet diaphragm 16 and the outlet diaphragm 14 when viewed in cross-section protrude in opposing directions from the retention pin 28 radially outward and cooperate with diametrically opposing connection openings 20 in the base member 24. According to the second embodiment, there is also provision for there to be formed integrally at the end side on the retention pin 28 contractions and head pieces 32 which are increased in terms of diameter with respect thereto, the head pieces 32 being inserted through openings of the inlet diaphragm 16 and the outlet diaphragm 14 with resilient deformation, in order to form a positive-locking connection with an undercut cross-section between the retention pin 28, on the one hand, and the inlet and outlet diaphragm 16, 14, on the other hand. The inlet diaphragm 16 and outlet diaphragm 14 which are secured in this manner to the retention pin 28 then at the same time form an axial securing member for the retention pin 28 in the through-hole 30 of the base member 24.

In this second embodiment, the circulation device 12 therefore also contains an integral base member 24 which can be assembled on the spring brake cylinder 1 simply by inserting the formed retention portion 26 into the associated through-opening 22 in the base 6 and which comprises a resilient material such as an elastomer material, and on which all the through-openings 20 are already formed. The circulation device 12 further contains the retention pin 28 which is retained in or on the base member 24 together with the inlet diaphragm 16 which is formed thereon and the outlet diaphragm 14.

In order to assemble the circulation device 12, therefore, the retention pin 28 is first inserted into the through-hole 30 in the base member 24 and there is then secured thereto at the end side the inlet diaphragm 16 (inner side) and the outlet diaphragm 14 (outer side). Subsequently, the base member 24 with the mounted inlet diaphragm 16 and outlet diaphragm 14 with the retention portion 26 thereof as already described in the first embodiment, is secured in the through-opening 22 in the base 6 of the spring brake cylinder 1 in a positive-locking manner.

Both embodiments therefore have in common an integral base member 24 of a resilient material, having a retention portion 26 which can be assembled with resilient deformation in an associated through-opening 22 in the base 6 of the spring brake cylinder in a positive-locking manner and on which the outlet diaphragm 14 may optionally already be formed. Furthermore, there is retained in a hole 30 of the base member 24 a retention pin 28, on which there is/are formed at least one inlet diaphragm 16 and/or at least one outlet diaphragm 14 which cooperate with connection openings formed in the base member 24 as a diaphragm valve. The retention pin 28 is assembled on the base member 24 with resilient deformation of the hole 30.

The invention is not limited to an inlet diaphragm 16 or an outlet diaphragm 14. Instead, a plurality of inlet and outlet diaphragms 16, 14 may be provided. Furthermore, the spring brake cylinder 1, instead of being constructed as an integral component of a combined service brake and spring brake cylinder, may also be constructed as a separate spring brake cylinder.

LIST OF REFERENCE NUMERALS

1 Spring brake cylinder
2 Spring brake piston

4 Preloaded spring
6 Base
8 Spring brake chamber
10 Spring chamber
12 Circulation device
14 Outlet diaphragm
16 Inlet diaphragm
18 Atmosphere
20 Connection opening
22 Through-opening
24 Base member
26 Retention portion
28 Retention pin
30 Through-hole
32 Head piece
34 Recess
36 Web
38 Hole
40 Pin The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring brake cylinder for a vehicle, comprising:
    a housing of the spring brake cylinder;
    a spring brake piston arranged in the housing and being actuable via a preloaded spring, the spring brake piston separating a spring chamber containing the preloaded spring from a spring brake chamber which is ventilated for release and vented for deployment;
    a diaphragm valve configured to vent the spring chamber directly to atmosphere, the diaphragm valve comprising at least one resiliently movable outlet diaphragm and at least one resiliently movable inlet diaphragm, wherein
    in a home position, the inlet diaphragm and the outlet diaphragm contact an associated valve seat in a closed position,
    in an event of a pressure difference exceeding a respective minimum pressure value between the spring chamber and the atmosphere, the inlet and outlet diaphragms are controlled into an open position lifted-off of the associated valve seat in order to increase and decrease pressure in the spring chamber,
    the at least one inlet diaphragm and the at least one outlet diaphragm are connected to a base member which is retained in a central through-opening in a base of the spring chamber,
    the base member is constructed in an integral manner from a resilient material, having a retention portion which is assembleable in a positive-locking manner with resilient deformation in the through-opening in the base of the spring chambers;
    a retention pin is retained on the base member, on which retention pin is formed the at least one inlet diaphragm and/or the at least one outlet diaphragm, which cooperates as a diaphragm valve with at least one connection opening formed in the base member or in the base between the spring chamber and the atmosphere,
    the at least one outlet diaphragm is formed at the end side in the manner of a lip on a web of the base member, which web bridges an annular recess in an outer face of the base of the spring brake cylinder, and
    the outlet diaphragm cooperates with at least one outer valve seat at the edge of at least one connection opening in the base of the spring brake cylinder, wherein the web and the at least one outlet diaphragm are constructed integrally with the base member.

2. The spring brake cylinder according to claim 1, wherein the at least one inlet diaphragm and the at least one outlet diaphragm are constructed so as to be separated from each other, wherein a separate valve seat is associated with the inlet diaphragm and the outlet diaphragm, respectively.

3. The spring brake cylinder according to claim 2, wherein the at least one inlet diaphragm and the at least one outlet diaphragm are connected to a base member which is retained in a central through-opening in a base of the spring chamber.

4. The spring brake cylinder according to claim 1, wherein:
    the base member is retained in a positive-locking manner in the through-opening in the base of the spring chamber via the retention portion which has an undercut cross-section,
    the retention portion is resiliently deformed from the outer side when the base member is introduced into the through-opening in order, in the assembled end state, to protrude inside the spring chamber in a manner engaging over an inner edge of the through-opening.

5. The spring brake cylinder according to claim 4, wherein the retention portion of the base member is constructed in a conical manner and tapers in a direction toward an inner side of the spring chamber.

6. The spring brake cylinder according to claim 5, wherein the at least one inlet diaphragm is arranged on a base face of the base member, which face is directed inside the spring chamber, and the at least one outlet diaphragm is arranged on an outwardly facing outer face of the base member.

7. The spring brake cylinder according to claim 6, wherein the at least one inlet diaphragm and the at least one outlet diaphragm cooperate with a plurality of connection openings between the spring chamber and the atmosphere in a sealing manner.

8. The spring brake cylinder according to claim 1, wherein a plurality of connection openings are formed in the base member or at least one connection opening is formed in the base member and at least one connection opening is formed in the base of the spring chamber.

9. The spring brake cylinder according to claim 1, wherein the at least one inlet diaphragm is connected to the retention pin, the retention pin being retained in the base member, and the at least one inlet diaphragm protruding radially at right angles from the retention pin.

10. The spring brake cylinder according to claim 9, wherein the inlet diaphragm is constructed as a disc diaphragm which is integral with the retention pin produced from a resilient material and which, from an end of the retention pin directed inside the spring chamber in a manner protruding radially outward, forms a free disc diaphragm edge which cooperates in a sealing manner with a plurality of connection openings in the base member which are radially spaced from the retention pin.

11. The spring brake cylinder according to claim 10, wherein:
    the retention pin is retained in the base member in a positive-locking manner so as to protrude through a central through-hole of the base member with a head piece which is expanded in cross-section and which faces outward,
    the head piece and/or the base member is/are resiliently deformed when the retention pin is inserted into the through-hole of the base member in order in the assembled end state to engage over an outer edge of the through-hole of the base member in a positive-locking manner.

12. The spring brake cylinder according to claim 1, wherein the web between the outlet diaphragm and the recess in the base of the spring brake cylinder is retained on the base by a pin which protrudes away from the web and which is retained in a hole in the base in a positive-locking manner.

13. The spring brake cylinder according to claim 9, wherein the at least one inlet diaphragm and the at least one outlet diaphragm, when viewed in cross-section, protrude in opposite directions away from the retention pin in a radially outward direction and cooperate with diametrically opposing connection openings in the base member.

14. The spring brake cylinder according to claim 13, wherein:
head pieces are formed integrally on the retention pin at the end side, which are increased in terms of diameter with respect thereto,
the head pieces are inserted through openings of the inlet diaphragm and the outlet diaphragm with resilient deformation, in order to form a positive-locking connection with an undercut cross-section between the retention pin, on the one hand, and the inlet diaphragm and outlet diaphragm, on the other hand, and
the inlet diaphragm and outlet diaphragm which are secured to the retention pin in this manner at the same time form an axial securing member for the retention pin in the through-hole of the base member.

15. The spring brake cylinder according to claim 1, wherein a service brake cylinder is combined with the spring brake cylinder to provide a combined service brake and spring brake cylinder.

16. A combined service brake and spring brake cylinder for a vehicle, comprising:
a service brake cylinder;
a spring brake cylinder combined with the service brake cylinder, the spring brake cylinder comprising:
a housing of the spring brake cylinder;
a spring brake piston arranged in the housing and being actuatable via a preloaded spring, the spring brake piston separating a spring chamber containing the preloaded spring from a spring brake chamber which is ventilated for release and vented for deployment;
a diaphragm valve configured to vent the spring chamber directly to atmosphere, the diaphragm valve comprising at least one resiliently movable outlet diaphragm and at least one resiliently movable inlet diaphragm, wherein
in a home position, the inlet diaphragm and the outlet diaphragm contact an associated valve seat in a closed position,
in an event of a pressure difference exceeding a respective minimum pressure value between the spring chamber and the atmosphere, the inlet and outlet diaphragms are controlled into an open position lifted-off of the associated valve seat in order to increase and decrease pressure in the spring chamber,
the at least one inlet diaphragm and the at least one outlet diaphragm are connected to a base member which is retained in a central through-opening in a base of the spring chamber,
the base member is constructed in an integral manner from a resilient material, having a retention portion which is assembleable in a positive-locking manner with resilient deformation in the through-opening in the base of the spring chambers;
a retention pin is retained on the base member, on which retention pin is formed the at least one inlet diaphragm and/or the at least one outlet diaphragm, which cooperates as a diaphragm valve with at least one connection opening formed in the base member or in the base between the spring chamber and the atmosphere,
the at least one outlet diaphragm is formed at the end side in the manner of a lip on a web of the base member, which web bridges an annular recess in an outer face of the base of the spring brake cylinder, and
the outlet diaphragm cooperates with at least one outer valve seat at the edge of at least one connection opening in the base of the spring brake cylinder, wherein the web and the at least one outlet diaphragm are constructed integrally with the base member.

* * * * *